US009163887B2

(12) United States Patent
Katayama et al.

(10) Patent No.: US 9,163,887 B2
(45) Date of Patent: Oct. 20, 2015

(54) BATTERY COOLING STRUCTURE

(71) Applicant: HONDA MOTOR CO., LTD., Tokyo (JP)

(72) Inventors: Goichi Katayama, Wako (JP); Koichi Yamamoto, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 187 days.

(21) Appl. No.: 13/672,700

(22) Filed: Nov. 8, 2012

(65) Prior Publication Data

US 2013/0146249 A1    Jun. 13, 2013

(30) Foreign Application Priority Data

Dec. 9, 2011    (JP) ................................ 2011-269834

(51) Int. Cl.
*H05K 7/20* (2006.01)
*F28F 9/00* (2006.01)
(Continued)

(52) U.S. Cl.
CPC .............. *F28F 9/00* (2013.01); *H01M 2/1016* (2013.01); *H01M 10/613* (2015.04); *H01M 10/6554* (2015.04)

(58) Field of Classification Search
CPC ..... H05K 5/10; H05K 5/0026; H05K 5/0082; H05K 5/0021; H05K 5/0086–5/06; H05K 5/069; H05K 7/005–7/08; H05K 7/20; H05K 7/00; H05K 7/1422; H05K 1/0218–1/0219; H05K 1/00; H05K 3/00; H05K 9/00; H05K 7/20218–7/20381; H05K 7/20409–7/20418; H05K 7/20009–7/202; G06F 1/16–1/1654; G06F 1/1656; G06F 1/1662–1/1681; G06F 1/1684–1/189; G06F 1/20; G06F 1/203; G06F 1/206; G06F 2200/201; G06F 2200/202; G06F 2200/203; G06F 1/181–1/182; H01G 2/00; H01G 4/00; H01G 5/00; H01G 7/00; H01G 9/00–9/155; H01G 11/00; H02G 3/00; H02G 5/00; H02G 7/00; H02G 9/00; H02G 11/00; H02G 13/00; H02G 15/00; H01B 7/00; H01B 11/00; H01B 17/00; H01R 4/00; H01R 9/00; H01R 13/00; H01K 1/00; H01K 3/00; H02B 1/00; H01H 37/00; H01L 23/367–23/3677; H01L 23/473; H01L 23/46–23/467
USPC ........................ 361/679.46–679.54, 688–723, 361/676–678; 165/80.1–80.5, 104.33, 185; 174/15.1–15.2, 16.1–16.3, 15.1–15.3, 174/547–548; 180/68.1–68.6, 65.1, 65.21; 257/712–722, E23.088; 24/453, 24/458–459; 312/236
See application file for complete search history.

(56) References Cited

U.S. PATENT DOCUMENTS 5,756,227 A * 5/1998 Suzuki et al. ................... 429/62
8,194,407 B2 * 6/2012 Yamaguchi et al. .......... 361/708
(Continued)

FOREIGN PATENT DOCUMENTS

| JP | 8-148187 | 6/1996 |
| JP | 2011-034775 | 2/2011 |
| JP | 2011-096536 | 5/2011 |

OTHER PUBLICATIONS

Japanese Office Action for corresponding JP Application No. 2011-269834, Apr. 7, 2014.

*Primary Examiner* — Anthony Haughton
*Assistant Examiner* — Razmeen Gafur
(74) *Attorney, Agent, or Firm* — Mori & Ward, LLP

(57) ABSTRACT

A battery cooling structure includes a cooling plate and a heat transfer sheet. The cooling plate is to cool a battery module including a plurality of battery cells arranged side by side. The heat transfer sheet is provided between the cooling plate and a cooling surface of the battery module to transfer heat from the cooling surface to the cooling plate. The heat transfer sheet is deformable by a pressure applied to the heat transfer sheet. The heat transfer sheet includes a positioning hole through which the cooling surface of the battery module is visible when the heat transfer sheet is assembled to the battery module.

14 Claims, 11 Drawing Sheets

(51) Int. Cl.
*H01M 2/10* (2006.01)
*H01M 10/6554* (2014.01)
*H01M 10/613* (2014.01)
*H01L 23/473* (2006.01)

(56) References Cited

U.S. PATENT DOCUMENTS

| | | | |
|---|---|---|---|
| 8,254,128 B2* | 8/2012 | Yasui | 361/711 |
| 8,325,483 B2* | 12/2012 | Kondoh et al. | 361/704 |
| 2001/0046624 A1* | 11/2001 | Goto et al. | 429/99 |
| 2004/0021442 A1* | 2/2004 | Higashino | 320/112 |
| 2005/0260488 A1* | 11/2005 | Zhou et al. | 429/99 |
| 2006/0028170 A1* | 2/2006 | Izawa | 320/107 |
| 2007/0046259 A1* | 3/2007 | Shimizu | 320/116 |
| 2007/0103045 A1* | 5/2007 | Shin | 313/44 |
| 2007/0131387 A1* | 6/2007 | Kawabata et al. | 165/80.3 |
| 2007/0258199 A1* | 11/2007 | Jeong | 361/681 |
| 2007/0284167 A1* | 12/2007 | Watanabe et al. | 180/68.5 |
| 2008/0068801 A1* | 3/2008 | Wilk | 361/702 |
| 2008/0265586 A1* | 10/2008 | Like et al. | 290/38 R |
| 2009/0142654 A1* | 6/2009 | Fakers et al. | 429/120 |
| 2009/0173559 A1* | 7/2009 | Nakamura | 180/68.5 |
| 2009/0213550 A1* | 8/2009 | Hongo | 361/704 |
| 2009/0219694 A1* | 9/2009 | Marz et al. | 361/699 |
| 2009/0317698 A1* | 12/2009 | Murata | 429/62 |
| 2010/0129703 A1* | 5/2010 | Caumont et al. | 429/120 |
| 2010/0187027 A1* | 7/2010 | Komaki | 180/65.21 |
| 2010/0254093 A1* | 10/2010 | Oota et al. | 361/720 |
| 2011/0104548 A1* | 5/2011 | Saito et al. | 429/120 |

* cited by examiner

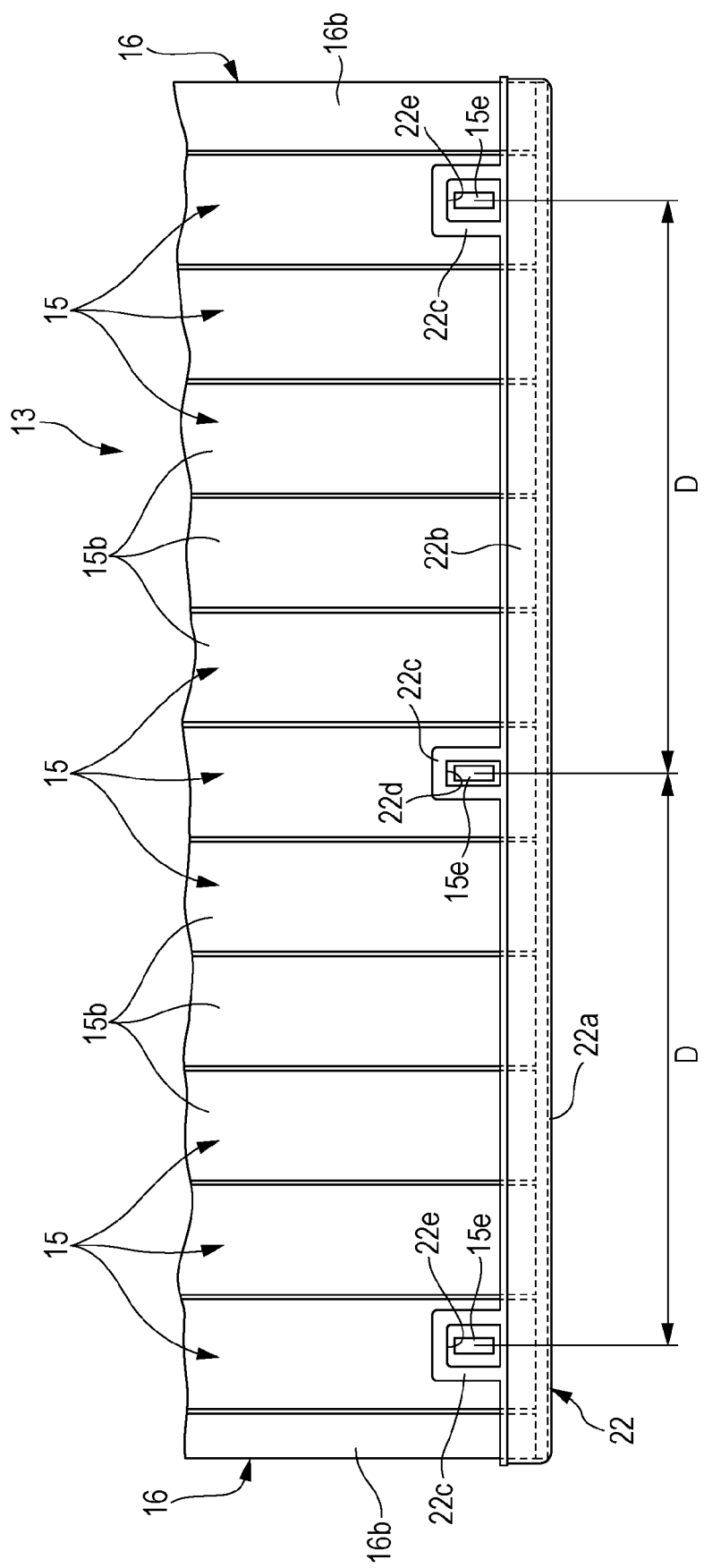

BATTERY COOLING STRUCTURE

CROSS-REFERENCE TO RELATED APPLICATIONS

The present application claims priority under 35 U.S.C. §119 to Japanese Patent Application No. 2011-269834, Dec. 9, 2011, entitled "Battery Cooling Structure." The contents of this application are incorporated herein by reference in their entirety.

BACKGROUND OF THE INVENTION

1. Field of the Invention

The present application relates to a battery cooling structure.

2. Discussion of the Background

In the case where a cooling surface of a battery module is supported by a hollow cooling plate in which a refrigerant flows, and the battery module is cooled by transferring heat generated in the battery module from the cooling surface to the cooling plate, a small gap is unavoidably formed between the cooling surface of the battery module, which is a rigid body, and the cooling plate, which also is a rigid body. The gap suppresses heat transference between the cooling surface and the cooling plate, thereby degrading the performance with which the battery module is cooled.

In order to solve the above-described problem, the following technology, which is disclosed in Japanese Unexamined Patent Application Publication No. 2011-34775, is known. That is, a heat transfer sheet, which is deformable and has a good heat transfer property, is sandwiched between a cooling surface of a battery module and a cooling plate, so that the gap between the cooling surface of the battery module and the cooling plate is eliminated by deformation of the heat transfer sheet. This facilitates heat transfer from the cooling surface to the cooling plate, thereby improving performance with which the battery module is cooled.

SUMMARY OF THE INVENTION

According to one aspect of the present invention, a battery cooling structure includes a cooling plate and a heat transfer sheet. The cooling plate is to cool a battery module including a plurality of battery cells arranged side by side. The heat transfer sheet is provided between the cooling plate and a cooling surface of the battery module to transfer heat from the cooling surface to the cooling plate. The heat transfer sheet is deformable by a pressure applied to the heat transfer sheet. The heat transfer sheet includes a positioning hole through which the cooling surface of the battery module is visible when the heat transfer sheet is assembled to the battery module.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 8 is a diagram of the structure illustrated in FIG. 2 seen from a direction indicated by an arrow VIII in FIG. 2 (first embodiment).

DESCRIPTION OF THE EMBODIMENTS

Figure 1:
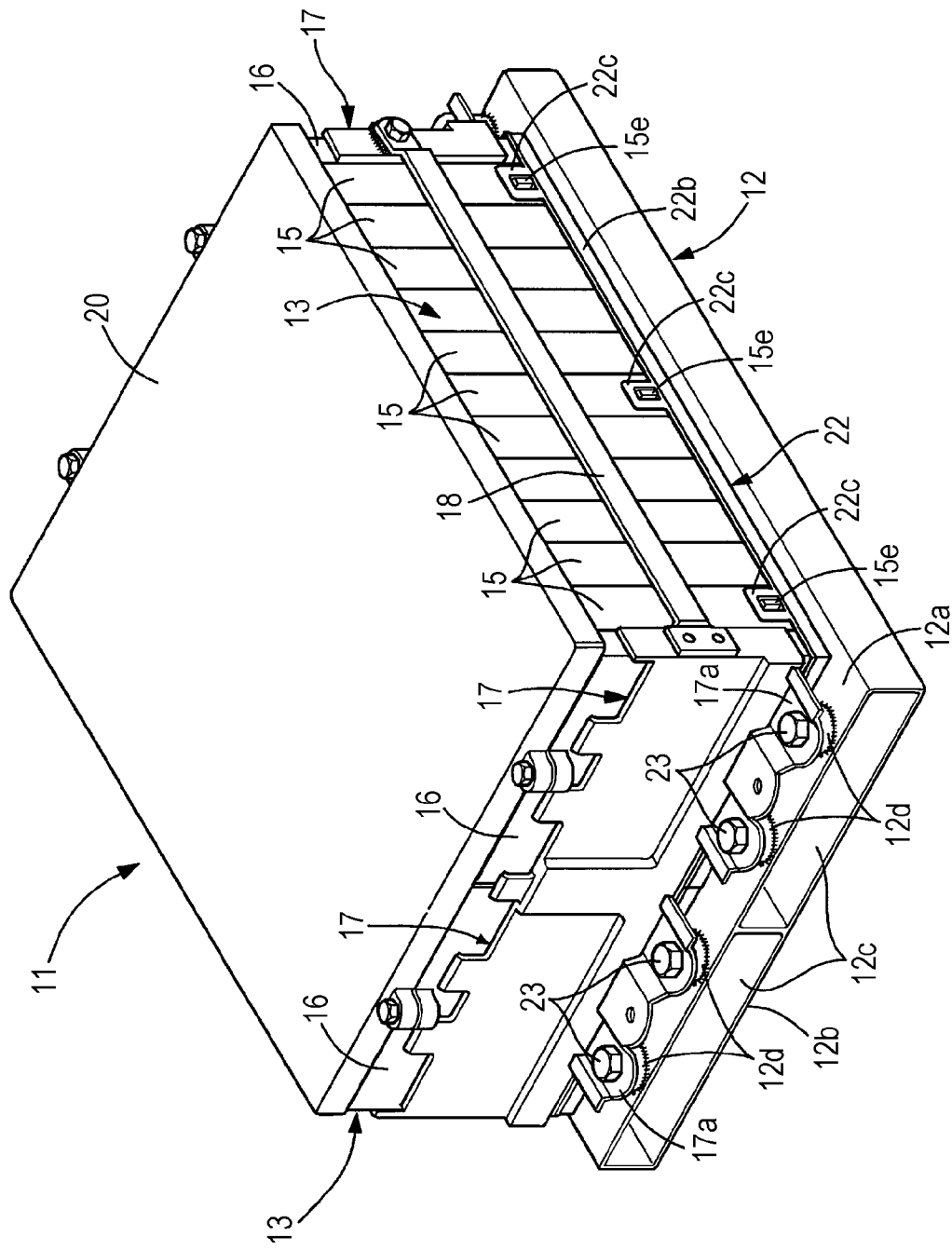
FIG. 1 is a perspective view of a battery module (first embodiment).

The embodiments will now be described with reference to the accompanying drawings, wherein like reference numerals designate corresponding or identical elements throughout the various drawings.

Embodiments of the present application will be described below with reference to FIGS. 1 to 11C.

Figure 2:
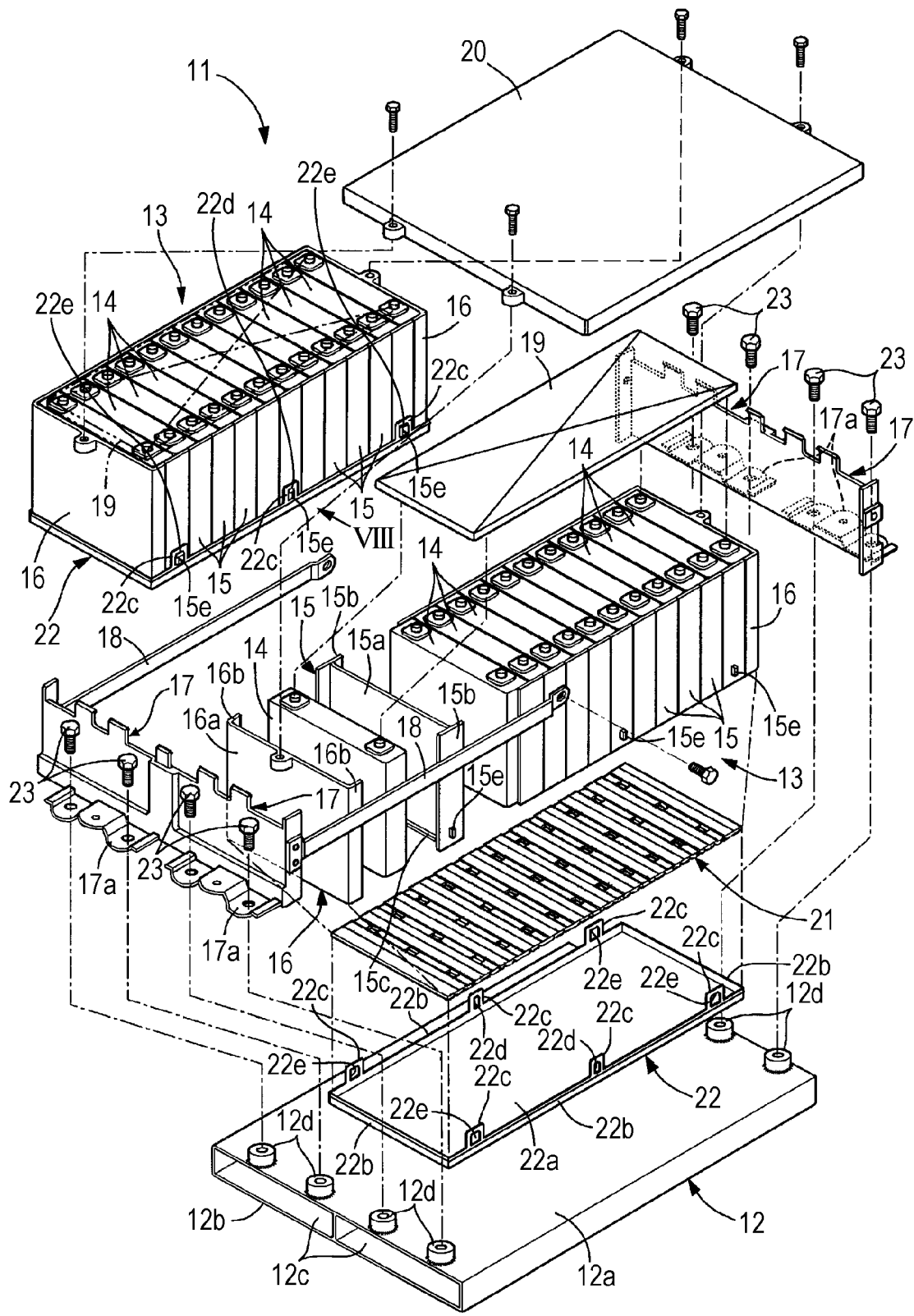
FIG. 2 is an exploded perspective view of the battery module (first embodiment).

As illustrated in FIGS. 1 and 2, a battery pack 11, which is to be installed on an electric vehicle, includes a cooling plate 12 and a plurality of battery modules 13, which are supported on the cooling plate 12. Two battery modules 13 and part of the cooling plate 12 are illustrated in FIGS. 1 and 2. Although two battery modules 13, each of which has substantially the same structure, are integrated into a single unit in the present embodiment.

The battery modules 13 each structured such that a plurality of (12 in the embodiment) box-shaped battery cells 14 are arranged side by side with intermediate holders 15 (holder) sandwiched between the battery cells 14 and end holders 16 disposed on the outer sides of two battery cells 14 located at both ends in a direction in which the battery cells 14 are arranged. The intermediate holders 15 and the end holders 16 are formed of synthetic resin.

As illustrated in FIGS. 3 to 6, each intermediate holder 15 having an H-shaped horizontal section, has a plate-shaped holder body portion 15a, a pair of side flanges 15b, and a lower flange 15c (positioning portion). In each intermediate holder 15, the holder body portion 15a is sandwiched between two adjacent battery cells 14, the side flanges 15b protrude from left and right side edges of the holder body portion 15a toward both sides in the battery cell 14 arranging direction, and the lower flange 15c protrudes from a lower edge of the holder body portion 15a toward both sides in the battery cell 14 arranging direction. The side flanges 15b of the adjacent intermediate holders 15 are engaged with one another, thereby regulating the mutual positional relationships between the intermediate holders 15, and as a result, the mutual relationships among the plurality of battery cells 14 are regulated. The width of the lower flange 15c is smaller than that of the side flanges 15b. Thus, in a state in which the adjacent side flanges 15b of the intermediate holders 15 are engaged with one another, the lower flanges 15c are not engaged with one another, and lower surfaces (cooling surfaces 14a, which will be described later) of the battery cells 14 are exposed in areas between the lower flanges 15c.

Each end holder 16, which has a staple-shaped horizontal section, has a plate-shaped holder body portion 16a and a pair of side flanges 16b. The holder body portions 16a are each in contact with an outer surface of a corresponding one of the battery cells 14 located at the outer sides in the battery cell 14 arranging direction. The side flanges 16*b* protrude from left and right side edges of the holder body portion 16*a* further toward the inside than the respective side edges in the battery cell 14 arranging direction. The side flange 16*b* are each engaged with the corresponding side flange 15*b* of the adjacent intermediate holders 15, thereby regulating the positional relationships among all the intermediate holders 15 and the end holders 16.

Referring back to FIGS. 1 and 2, a pair of end plates 17 are superposed on outer surfaces of the pair of end holders 16 of each battery module 13 in the battery cell 14 arranging direction. The pair of end plates 17 are fastened by a fastening belt 18, thereby firmly integrating 12 battery cells 14, 11 intermediate holders 15, and two end holders 16 with one another. Two fastening belts 18 are shared by two battery modules 13. Surfaces of the battery cells 14, the intermediate holders 15, and the end holders 16 in contact with one another are secured to one another with adhesive.

A busbar plate 19, which holds a plurality of busbars (not shown), is secured to an upper surface of each battery module 13. Terminals of the battery cells 14 are electrically connected to one another through the busbar plate 19. Upper surfaces of two battery modules 13 arranged side by side are covered with a common cover 20 formed of synthetic resin.

The lower surfaces of 12 battery cells 14 included in each battery module 13, the lower surfaces defining a lower surface of the battery module 13, form the cooling surfaces 14*a* that oppose an upper surface of the cooling plate 12 (see FIGS. 3 to 6). A rectangular heat transfer sheet 21 is sandwiched between these cooling surfaces 14*a* and the upper surface of the cooling plate 12. The heat transfer sheet 21 is formed of a synthetic resin having a good heat transfer property (for example, silicone rubber) and deformable into an arbitrary shape when a pressure is applied to the heat transfer sheet 21 so as to compress the heat transfer sheet 21. The heat transfer sheet 21 has a property, with which surfaces thereof are sticky (adhering property).

An electrically insulative sheet 22 is disposed between a lower surface of the heat transfer sheet 21 and the upper surface of the cooling plate 12. The electrically insulative sheet 22 is formed of a synthetic resin having an electrical non-conductivity and water repellency such as polypropylene (PP) or polyphenylene sulfide (PPS). The electrically insulative sheet 22 has a shallow tray shape and has a bottom wall portion 22*a* and side wall portions 22*b* that extend upward from the bottom wall portion 22*a*. A lower portion of the battery module 13 is fitted into the electrically insulative sheet 22. Accordingly, an upper surface of the heat transfer sheet 21 is in contact with the cooling surfaces 14*a* of the battery cells 14, and the lower surface of the heat transfer sheet 21 is in contact with an upper surface of the electrically insulative sheet 22. The electrically insulative sheet 22, the thickness of which is very small, substantially does not prevent heat from being transferred.

The cooling plate 12 is a hollow metal member having a good heat transfer property. The cooling plate 12 has a refrigerant path 12*c* defined by an upper wall portion 12*a* and a lower wall portion 12*b*, the refrigerant path 12*c* allowing a refrigerant (for example, cooling air) to flow therethrough. Cooling air is sucked by a cooling fan (not shown) so as to flow through the refrigerant path 12*c* of the cooling plate 12. Heat is transferred from the cooling surfaces 14*a* of the battery cells 14 through the heat transfer sheet 21 and the electrically insulative sheet 22 to the upper wall portion 12*a* and is subjected to heat exchange with the cooling air, thereby cooling the battery cells 14.

Figure 7A:
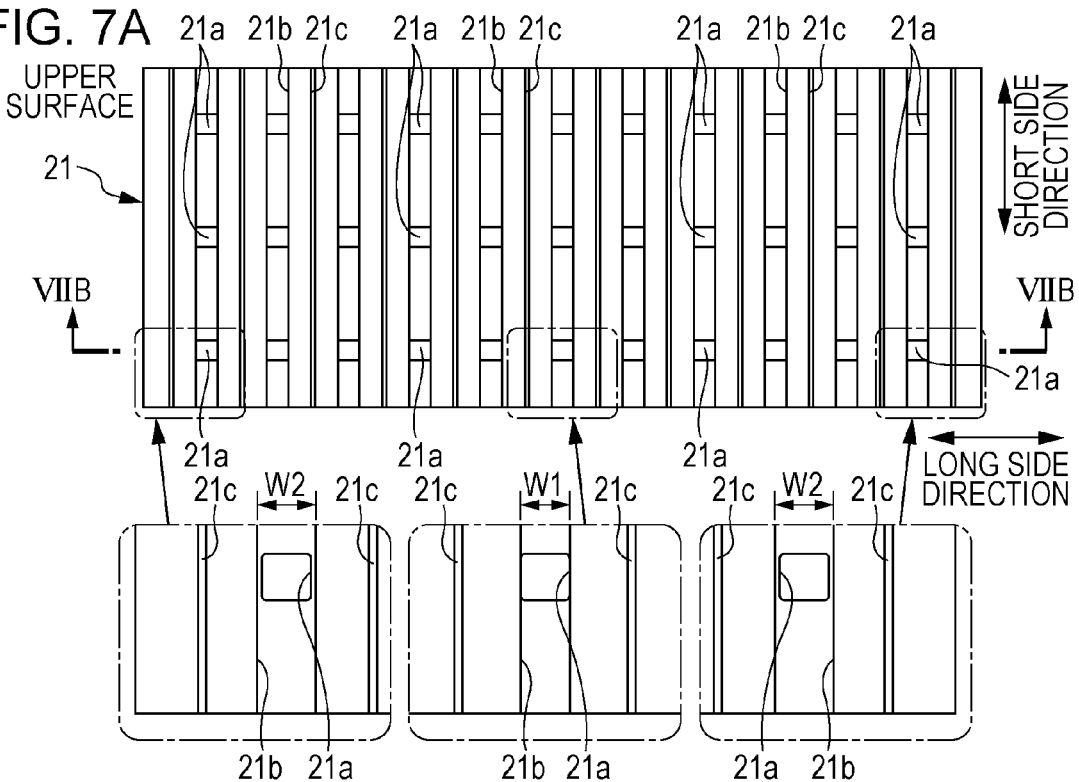
FIGS. 7A to 7C illustrate the shape of a heat transfer sheet (first embodiment).
Figure 7B:
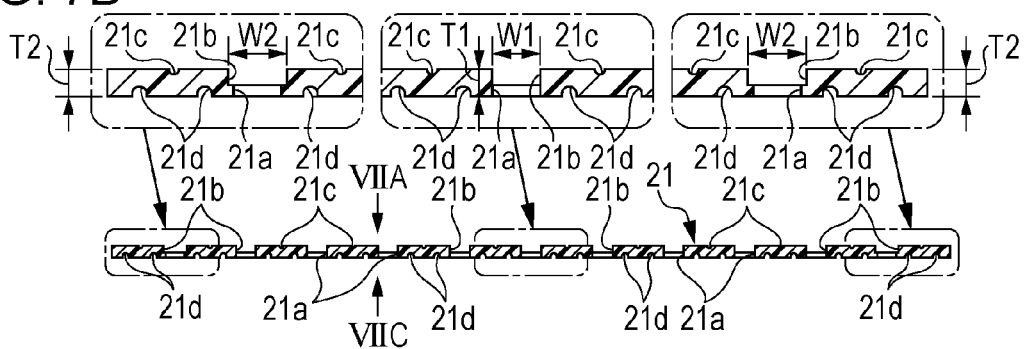
Figure 7C:
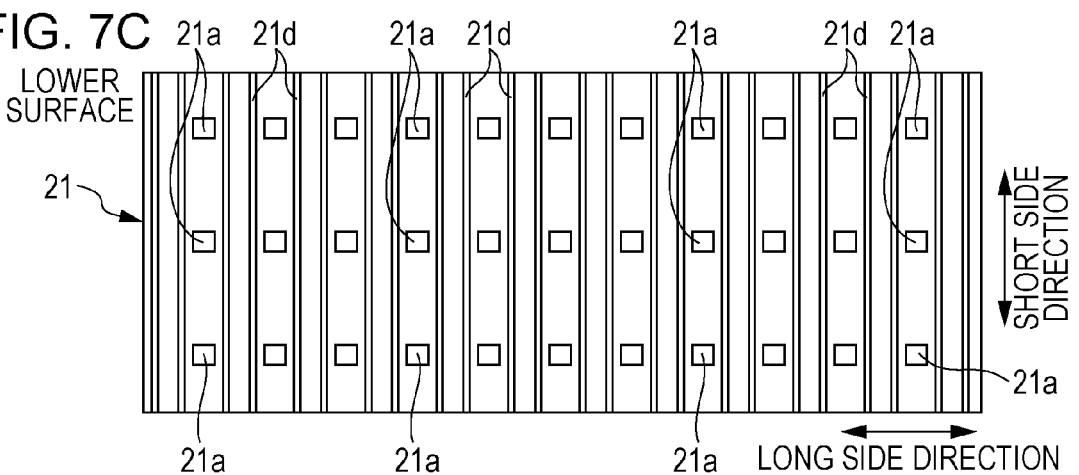

As illustrated in FIGS. 7A and 7C, the heat transfer sheet 21 has a rectangular shape having its long sides in the battery cell 14 arranging direction and its short sides in a direction perpendicular to the battery cell 14 arranging direction. The thickness of the heat transfer sheet 21 is uniform along the short sides and varied along the long sides. That is, in the heat transfer sheet 21, a thickness T1 in a central portion in a long side direction is large (for example, 4.1 mm) and a thickness T2 in both end portions in a long side direction is small (for example, 3.1 mm), and the thickness is continuously changed between T1 and T2.

The heat transfer sheet 21 has a total of 33 positioning holes 21*a* formed in three rows in the long side direction. A lower surface of the lower flange 15*c* of each intermediate holder 15, the intermediate holder 15 being sandwiched between the pair of adjacent battery cells 14, opposes three positioning holes 21*a*. The positioning holes 21*a* each have a square shape with its corners rounded. The width of the lower flanges 15*c* is smaller than the width of the positioning holes 21*a*. Thus, both side edges of each lower flange 15*c* are visible through the corresponding positioning holes 21*a*.

A total of 11 positioning grooves 21*b*, which extend parallel to the short sides of the heat transfer sheet 21, are formed in the upper surface of the heat transfer sheet 21, that is, in the surface opposite the cooling surfaces 14*a* of the battery cells 14. In the present embodiment, three positioning holes 21*a* are superposed on each positioning groove 21*b*. The lower flanges 15*c* of the intermediate holders 15 protrude downward beyond the cooling surfaces 14*a* of the battery cells 14. These lower flanges 15*c* are each fitted into a corresponding one of the positioning grooves 21*b*. In the heat transfer sheet 21, the widths of 11 positioning grooves 21*b* are varied in a step-by-step manner such that a width W1 in a portion where the thickness of the heat transfer sheet 21 is large (central portion in the long side direction) is small and a width W2 in portions where the thickness of the heat transfer sheet 21 is small (both end portions in the long side direction) is large.

A total of 12 first air bleeding grooves 21*c* are formed on the upper surfaces of the heat transfer sheet 21 along central portions of the cooling surfaces 14*a* of the battery cells 14. Thus, 11 positioning grooves 21*b* and the 12 first air bleeding grooves 21*c* are alternately formed so as to be parallel to one another. A total of 24 second air bleeding grooves 21*d* are formed on the lower surface of the heat transfer sheet 21 so as to extend along intermediate positions between the positioning grooves 21*b* and the first air bleeding grooves 21*c* such that two second air bleeding grooves 21*d* are formed between adjacent first air bleeding grooves 21*c*. Two second air bleeding grooves 21*d* oppose the cooling surface 14*a* of each battery cell 14, and the positions of the second air bleeding grooves 21*d* are shifted in the long side direction so as not to superposed on the positions of the positioning grooves 21*b* and the positions of the first air bleeding grooves 21*c*. The sectional area of the second air bleeding grooves 21*d* is set to be greater than that of the first air bleeding grooves 21*c*.

Ends of the positioning grooves 21*b*, the first air bleeding grooves 21*c*, and the second air bleeding grooves 21*d* reach the pair of long sides of the heat transfer sheet 21 so as to form openings.

The intermediate holders 15 and the end holders 16 respectively have protruding wall portions 15*d* and 16*c* formed throughout lower ends thereof. The protruding wall portions 15*d* and 16*c* downwardly extend beyond the cooling surfaces 14*a* of the battery cells 14 and protrude so as to extend toward areas under the cooling surfaces 14a. The protruding wall portions 15d and 16c are formed so as to surround an outer periphery of the heat transfer sheet 21 with small gaps α (see FIGS. 4 to 6) formed between the protruding wall portions 15d and 16c and the heat transfer sheet 21. A protruding height of the protruding wall portions 15d and 16c below the cooling surfaces 14a is set to be smaller than the thickness of the heat transfer sheet 21.

Figure 3:
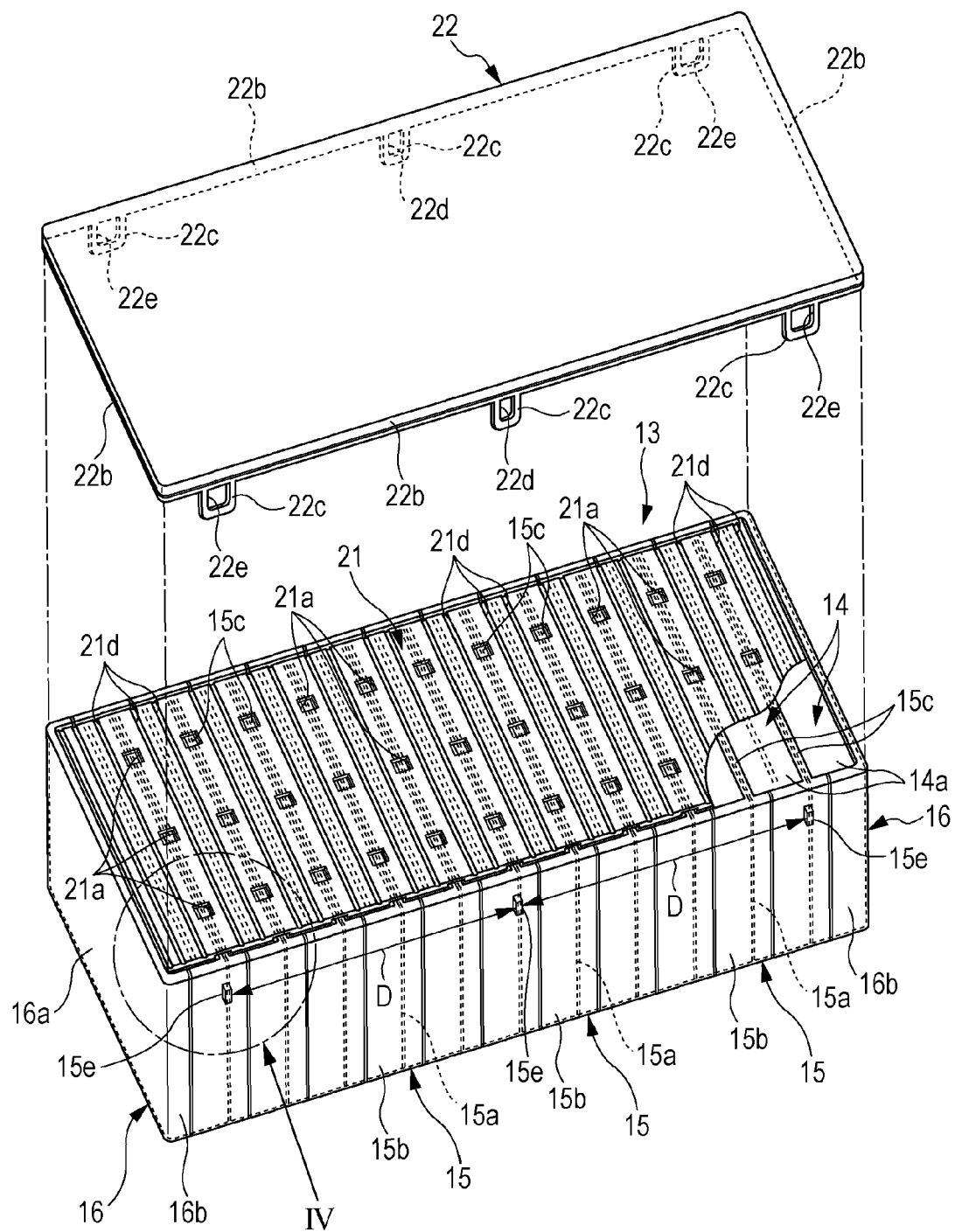
FIG. 3 is a perspective view of the vertically inverted battery module (first embodiment).

As illustrated in FIGS. 3 and 8, three retainers 22c protrude from an upper edge of the side wall portion 22b corresponding to each of a pair of long sides of the electrically insulative sheet 22. Among the three retainers 22c, the long side of a retaining hole 22d of the retainer 22c at the center is short and the long side of two retaining holes 22e of the retainers 22c at both ends is long. Retaining protrusions 15e that can be retained in the retaining holes 22d and 22e of the electrically insulative sheet 22 protrude on both side surfaces of three intermediate holders 15 disposed at positions corresponding to the retainers 22c.

Next, operation of the embodiment having the above-described structure will be described.

As illustrated in FIG. 3, when assembly of each of the two battery modules 13 is completed, the heat transfer sheet 21 is positioned with respect to the cooling surfaces 14a of the battery cells 14 of each battery module 13 and attached to the cooling surfaces 14a using the adhesive property of the heat transfer sheet 21. At this time, when the heat transfer sheet 21 is attached to a wrong position and removed from the cooling surfaces 14a, the flexible heat transfer sheet 21 may be damaged. In order to avoid damage to the heat transfer sheet 21, the heat transfer sheet 21 needs to be attached to a right position through a single attaching operation.

Figure 4:
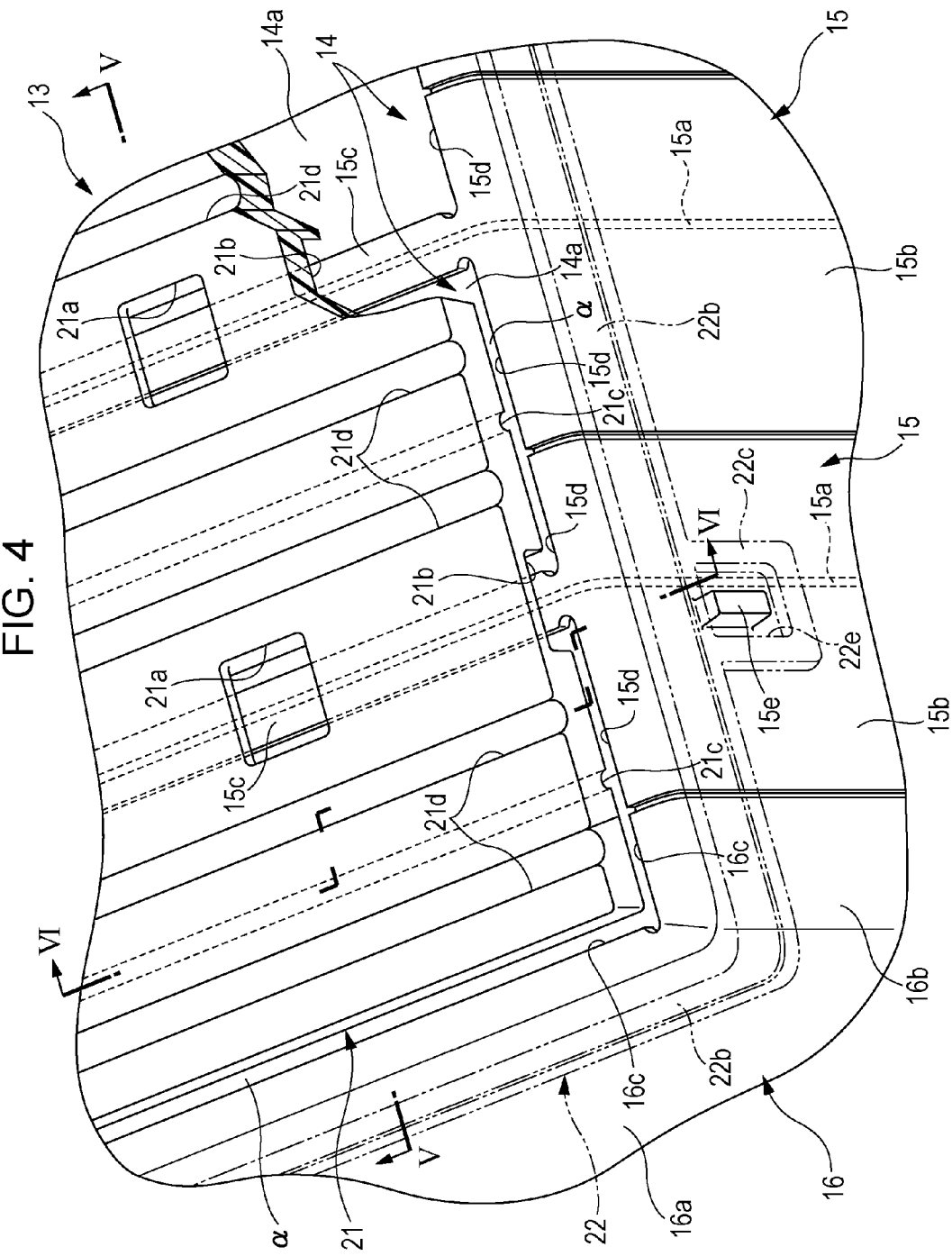
FIG. 4 is an enlarged view of part IV in FIG. 3 (first embodiment).

In order to attach the heat transfer sheet 21 to the right position through a single attaching operation, while visually checking the cooling surfaces 14a of the battery cells 14 through the positioning holes 21a of the heat transfer sheet 21, that is, visually checking the lower flanges 15c of the intermediate holders 15 visible together with the cooling surfaces 14a of the battery modules 13, an operator positions the heat transfer sheet 21 with respect to the cooling surfaces 14a and attaches the heat transfer sheet 21 to the cooling surfaces 14a so that the lower flanges 15c are positioned at central portions of the positioning holes 21a (see FIG. 4). Since there are plurality of the positioning holes 21a formed in a distributed manner over the entire cooling surfaces 14a, the heat transfer sheet 21 is highly precisely positioned. At this time, since the width of the lower flanges 15c is smaller than the width of the positioning holes 21a, both the side edges of each lower flange 15c are visible through the corresponding positioning holes 21a. Thus, precision with which the heat transfer sheet 21 is positioned is further improved.

Figure 5:
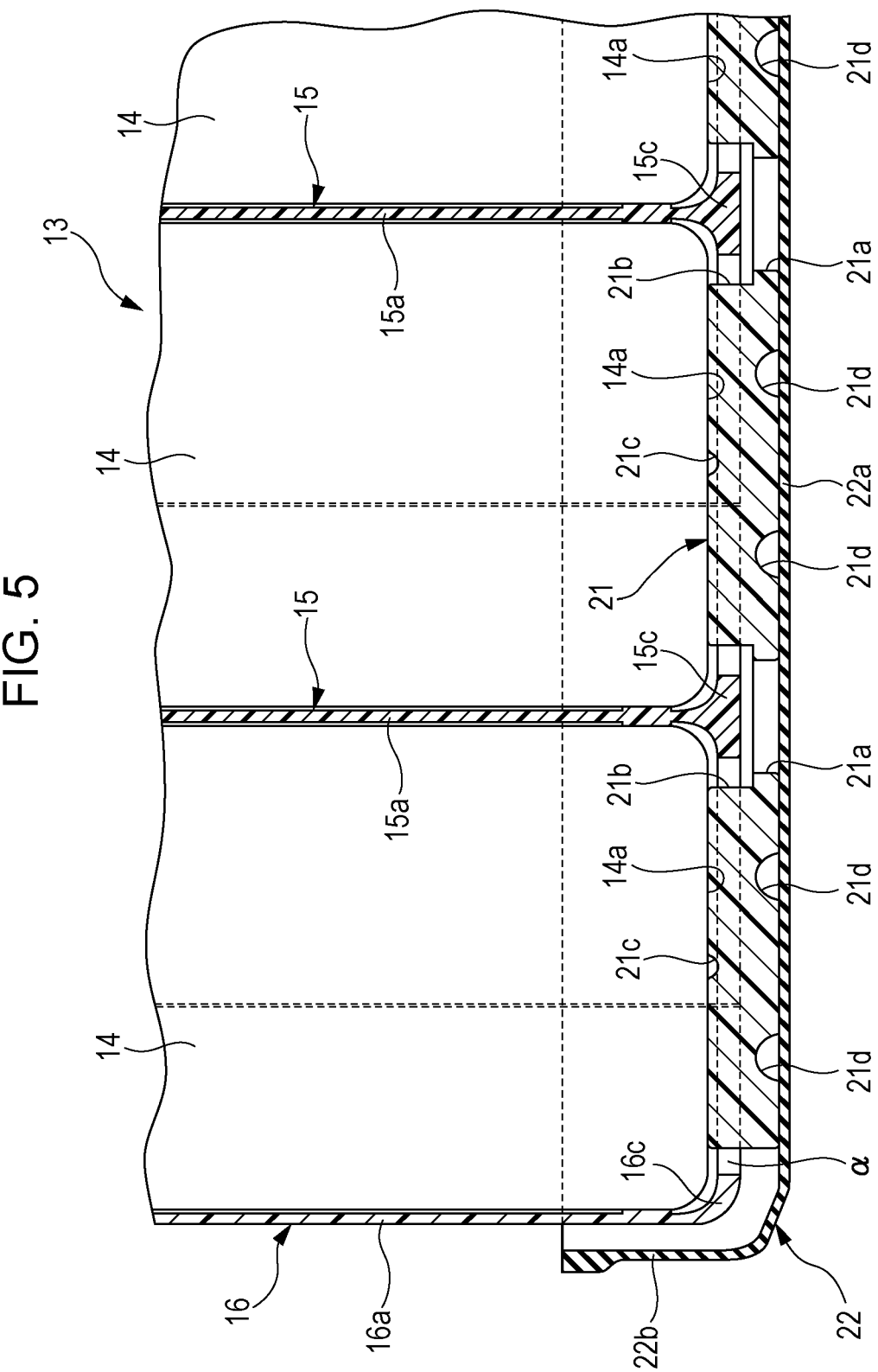
FIG. 5 is a sectional view of the structure illustrated in FIG. 4 taken along line V-V in FIG. 4 (first embodiment).
Figure 6:
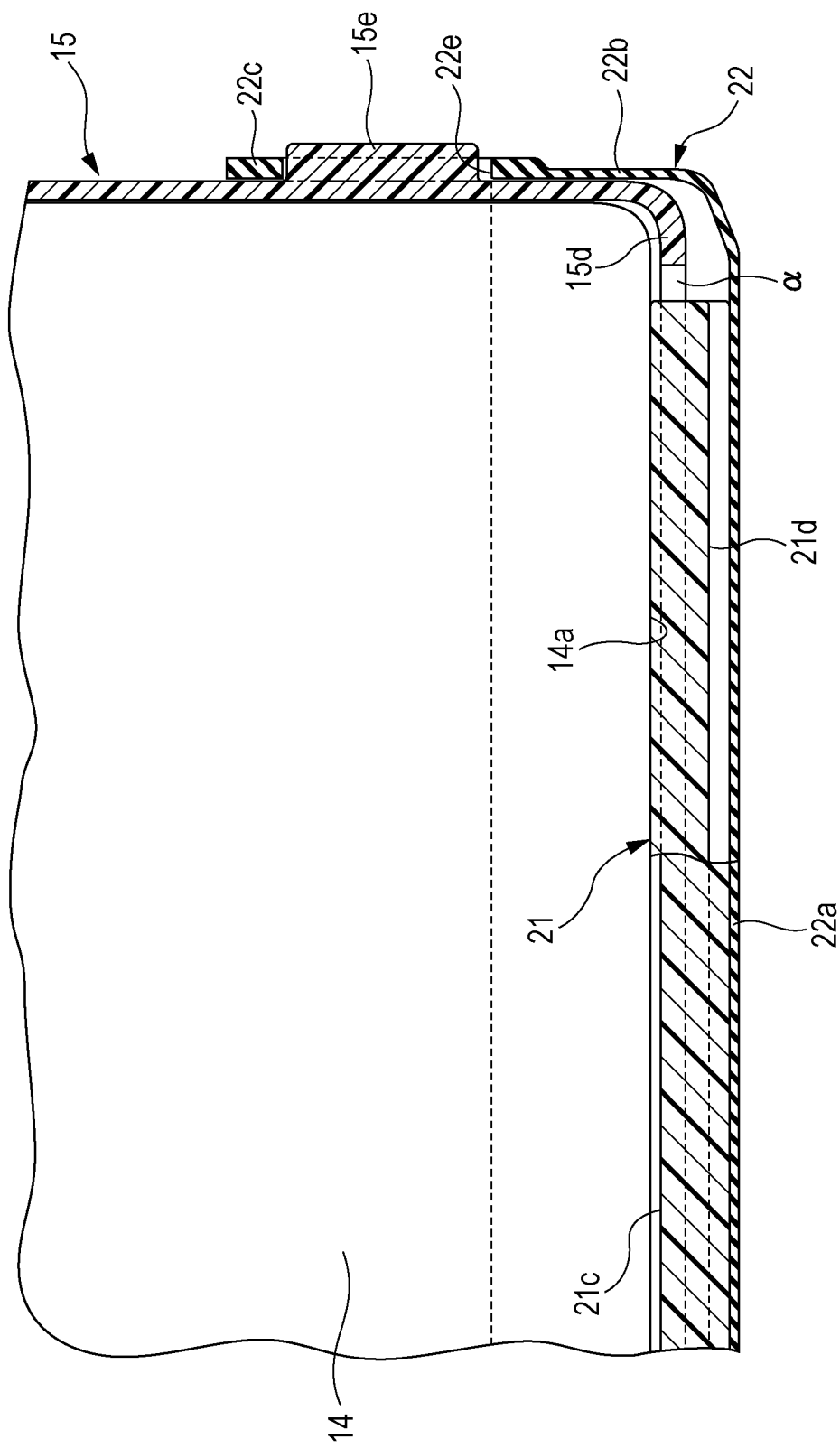
FIG. 6 is a sectional view of the structure illustrated in FIG. 4 taken along line VI-VI in FIG. 4 (first embodiment).

As can be clearly seen from FIGS. 4 to 6, attachment of the heat transfer sheet 21 to the cooling surfaces 14a, which would be obstructed by the lower flanges 15c of the intermediate holders 15 protruding beyond the cooling surfaces 14a of the battery modules 13, can be performed without trouble by fitting the lower flanges 15c into the positioning grooves 21b formed in the upper surface of the heat transfer sheet 21. At this time, by fitting the lower flanges 15c into the positioning grooves 21b, the heat transfer sheet 21 is physically positioned, thereby further improving precision with which the heat transfer sheet 21 is positioned. Furthermore, when the heat transfer sheet 21 is attached, the gaps α are formed between the outer periphery of the heat transfer sheet 21 and the protruding wall portions 15d and 16c of the intermediate holders 15 of the battery modules 13 and the end holders 16 of the battery modules 13. Thus, even when the heat transfer sheet 21 is attached at a slightly misaligned position, the heat transfer sheet 21 does not interfere with the protruding wall portions 15d and 16c.

Since the corners of the positioning holes 21a are rounded, even if the heat transfer sheet 21 is attached to a wrong position and removed so as to be attached again, a situation in which the heat transfer sheet 21 breaks due to stress concentrated in the corners of the positioning holes 21a can be avoided.

When attaching the heat transfer sheet 21 to the cooling surfaces 14a of the battery modules 13, air may be trapped between the upper surface of the heat transfer sheet 21 and the cooling surfaces 14a of the battery modules 13. This may prevent tight contact of the heat transfer sheet 21 with the cooling surfaces 14a at positions where the air is trapped, thereby forming a heat insulation layer formed by the air and degrading the heat transfer property. However, because of the plurality of first air bleeding grooves 21c formed in the upper surface of the heat transfer sheet 21, the trapped air is discharged through the first air bleeding grooves 21c to the outside, thereby making the heat transfer sheet 21 in tight contact with the cooling surfaces 14a. Thus, the heat transfer property can be improved. Here, it is clear that the positioning grooves 21b also function as air bleeding holes.

When the heat transfer sheet 21 has been attached to the cooling surfaces 14a of the battery modules 13 as described above, as illustrated in FIGS. 1, 3, and 4, the lower portions of the battery modules 13 is fitted into the tray-shaped electrically insulative sheet 22, and six retaining protrusions 15e of the side flanges 15b of three intermediate holders 15 are retained in the retaining holes 22d and 22e of six retainers 22c of the electrically insulative sheet 22, thereby integrating the electrically insulative sheet 22 with the battery modules 13 so as not to drop from the battery modules 13. Work for retaining the retaining protrusions 15e in the retaining holes 22d and 22e is easily performed since the electrically insulative sheet 22 is thin and arbitrarily deformable.

Since the battery module 13 is formed of 12 battery cells 14 arranged side by side, the distance D between six retaining protrusions 15e on the side surfaces of the intermediate holders 15 (see FIGS. 3 and 8) unavoidably varies due to a cumulative tolerance. However, the width of four retaining holes 22e located at both ends in the long side direction of the electrically insulative sheet 22 is set to be larger than the width of corresponding four retaining protrusions 15e. Thus, when four retaining protrusions 15e at both the ends in the long side direction of the battery module 13 are retained in four retaining holes 22e at both the ends in the long side direction of the electrically insulative sheet 22 after two retaining protrusions 15e at the center in the long side direction of the battery module 13 have been retained in two retaining holes 22d at the center in the long side direction of the electrically insulative sheet 22, the retaining protrusions 15e can be smoothly retained in the retaining holes 22d and 22e despite the above-described variation in the distance D between the retaining protrusions 15e.

In the present embodiment, by positioning the electrically insulative sheet 22 with reference to two retaining holes 22d at the center in the long side direction, the cumulative tolerance in the thicknesses of the battery cells 14 are distributed in two directions. Thus, misalignment between the four retaining holes 22e at both the ends in the long side direction and the corresponding four retaining protrusions 15e can be reduced as much as possible. If the electrically insulative sheet 22 is positioned with reference to two retaining holes 22e at one end in the long side direction, the amount by which two retaining holes 22e at the other end in the long side direction and the corresponding two retaining protrusions 15e are misaligned is doubled.

Figure 9:
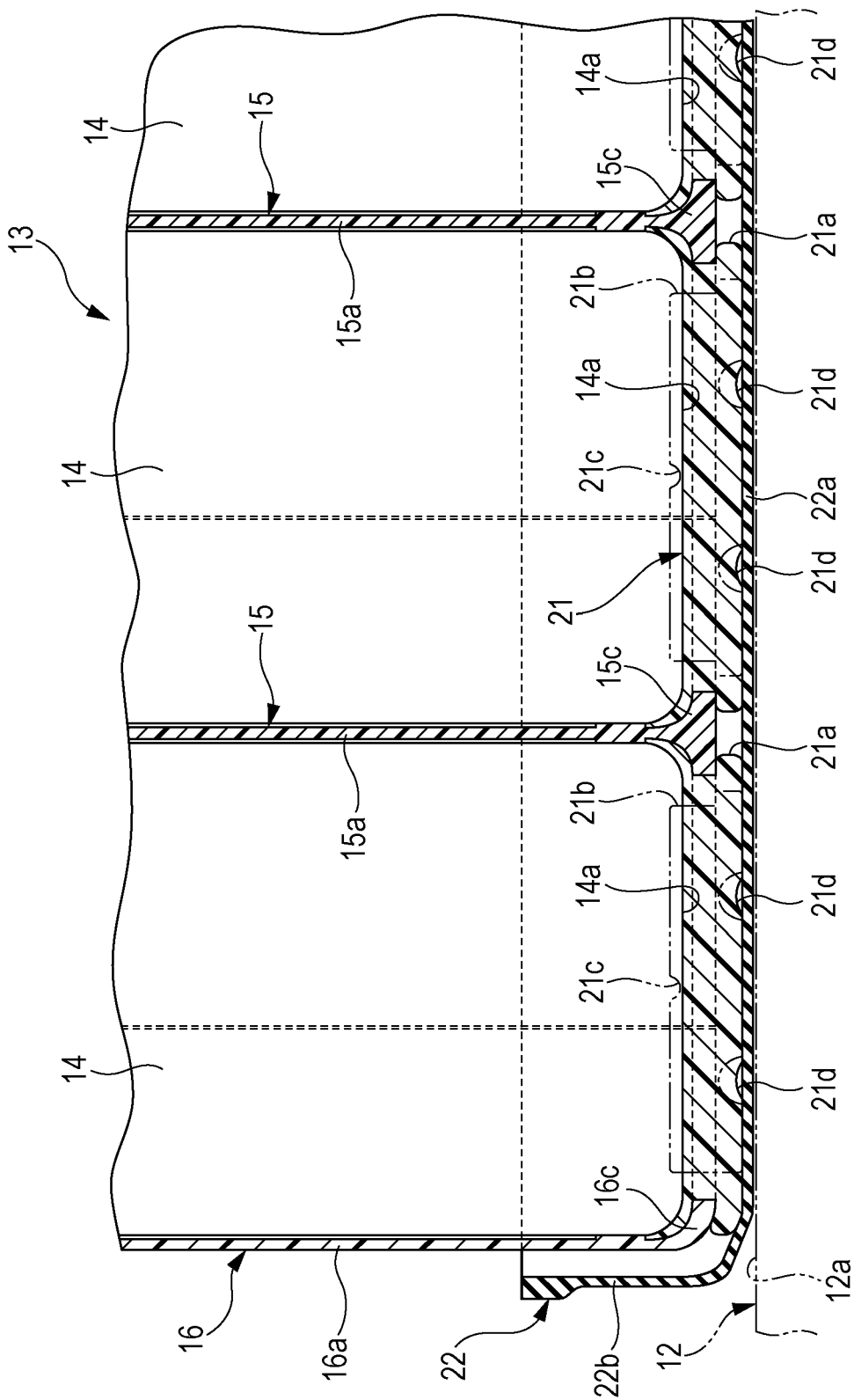
FIG. 9 illustrates how the structure illustrated in FIG. 5 works (first embodiment).
Figure 10:
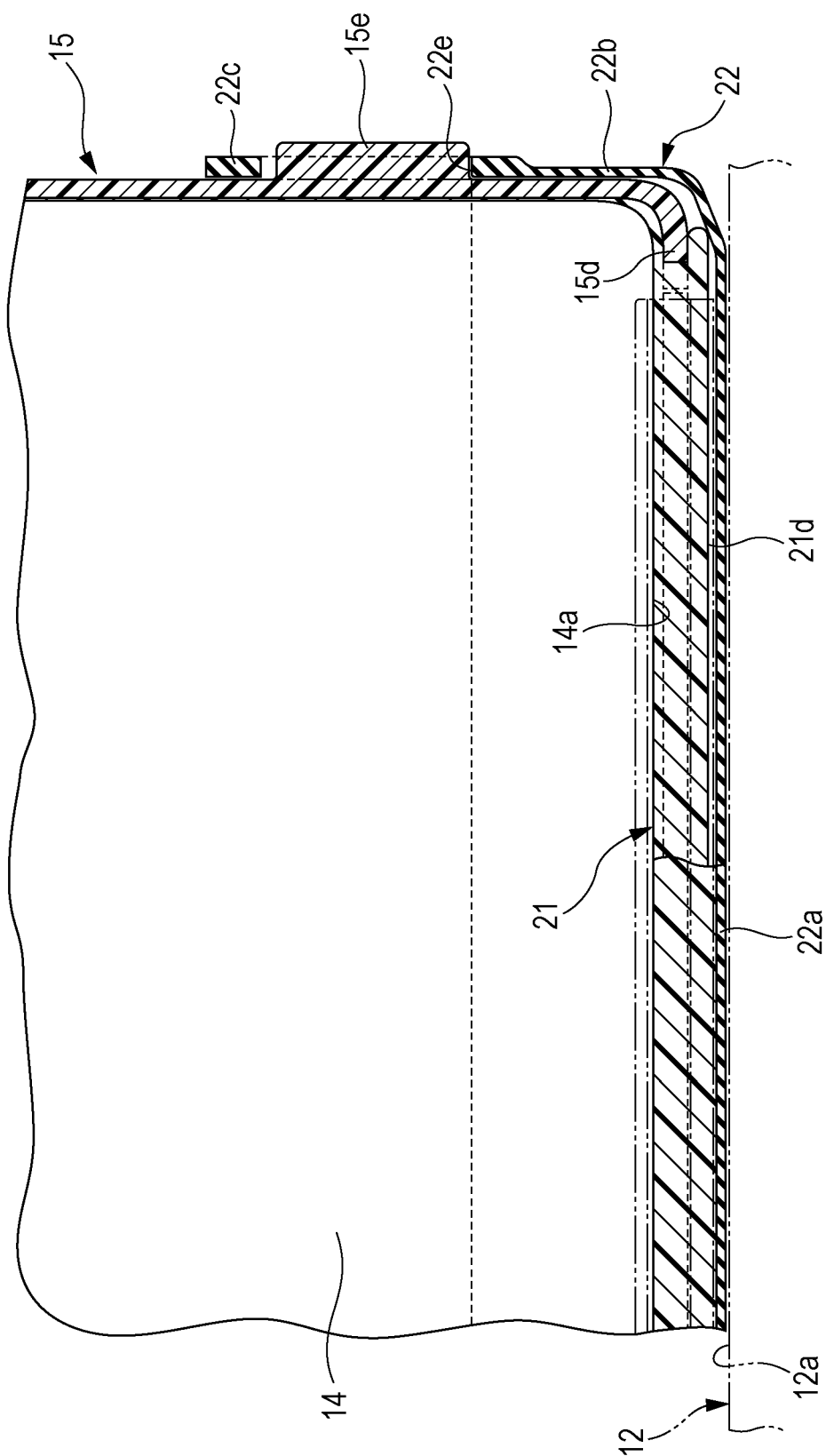
FIG. 10 illustrates how the structure illustrated in FIG. 6 works (first embodiment).

When the electrically insulative sheet 22 has been attached to each battery module 13 as described above, as illustrated in FIG. 1, the battery modules 13 are placed on the upper wall portion 12a of the cooling plate 12, and attaching flanges 17a of the end plates 17 are secured to attaching bosses 12d of the cooling plate 12 with bolts 23 inserted therethrough. As a result, as illustrated in FIGS. 9 and 10, the weight of the battery modules 13 is applied to the heat transfer sheet 21, thereby compressing the heat transfer sheets 21 in the up-down direction. This eliminate gaps between the upper surfaces of the heat transfer sheets 21 and the cooling surfaces 14a of the battery modules 13 and gaps between the lower surfaces of the heat transfer sheets 21 and the upper wall portion 12a of the cooling plate 12. Thus, heat is efficiently transferred from the battery modules 13 to the cooling plate 12, thereby improving the performance with which the battery modules 13 are cooled.

The bottom wall portions 22a of the electrically insulative sheets 22 are present between the lower surfaces of the heat transfer sheets 21 and the upper wall portion 12a of the cooling plate 12. However, since the electrically insulative sheets 22 are formed of very thin synthetic resin, and accordingly, easily deformable, the presence of the electrically insulative sheets 22 does not lead to formation of gaps that prevent heat from being transferred.

When air is trapped between the lower surfaces of the heat transfer sheets 21 and the upper wall portion 12a of the cooling plate 12, more exactly, between the lower surfaces of the heat transfer sheet 21 and the upper surfaces of the electrically insulative sheets 22, the air may prevent the heat transfer sheets 21 from tightly contacting the upper wall portion 12a of the cooling plate 12, and the air may serve as a heat insulation layer that degrades the heat transfer property. However, because of the plurality of second air bleeding grooves 21d formed in the lower surfaces of the heat transfer sheets 21, the trapped air is discharged through the second air bleeding grooves 21d to the outside, thereby making the heat transfer sheets 21 in tight contact with the upper wall portion 12a of the cooling plate 12. Thus, the heat transfer property can be improved.

When the heat transfer sheets 21 are compressed in the up-down direction, the outer periphery of each heat transfer sheet 21 tends to expand outward. However, since the protruding wall portions 15d of the intermediate holders 15 and the protruding wall portions 16c of the end holders 16 oppose the outer periphery of the heat transfer sheet 21 with the gaps α therebetween, the outer periphery of the heat transfer sheet 21 is blocked by the protruding wall portions 15d and 16c and prevented from expanding outward beyond the outer periphery of the battery module 13. The heat transfer sheets 21, which are prevented from expanding outward by the protruding wall portions 15d and 16c, expand inward so as to press the positioning holes 21a and reduce the size of the positioning holes 21a, thereby decreasing the opening areas of the positioning holes 21a.

It is intended that the positioning holes 21a are formed at positions corresponding to the lower flanges 15c of the intermediate holders 15 so that the positioning holes 21a do not prevent heat from being transferred from the cooling surfaces 14a. In addition, when the opening areas of the positioning holes 21a are reduced in a way as described above, and portions of the cooling surfaces 14a exposed on both sides of the lower flanges 15c of the intermediate holders 15 are covered by the heat transfer sheets 21, degradation of the heat transfer property caused by formation of the positioning holes 21a can be reduced as much as possible.

As is the case with the positioning holes 21a, the positioning grooves 21b, the first air bleeding grooves 21c, and the second air bleeding grooves 21d are also compressed and eliminated, or the sectional areas thereof are reduced. This allows degradation of the heat transfer property caused by formation of the positioning grooves 21b, the first air bleeding grooves 21c, and the second air bleeding grooves 21d to be reduced as much as possible.

Although the lower surface of each heat transfer sheet 21 is entirely in contact with the upper wall portion 12a of the cooling plate 12, the parts of the upper surface of the heat transfer sheet 21 corresponding to the lower flanges 15c of the intermediate holders 15 are not in contact with the cooling surfaces 14a. Thus, a heat transfer area of the upper surface is smaller than that of the lower surface, thereby degrading the heat transfer property. However, according to the present embodiment, when the heat transfer sheet 21 is compressed, the first air bleeding grooves 21c, which are formed in the upper surface of the heat transfer sheets 21 and have small sectional areas, are completely eliminated while the second air bleeding grooves 21d, which are formed in the lower surface of the heat transfer sheet 21 and have large sectional areas, are not completely eliminated. Thus, the heat transfer area of the lower surface is decreased by the area corresponding to the remaining second air bleeding grooves 21d. As a result, in each heat transfer sheet 21, the heat transfer area of the upper surface and the heat transfer area of the lower surface become substantially equal to each other, and accordingly, the heat transfer property can be prevented from being degraded.

In each heat transfer sheet 21, the positioning grooves 21b and the first air bleeding grooves 21c in the upper surface are arranged parallel to the second air bleeding grooves 21d in the lower surface so that the positioning grooves 21b and the first air bleeding grooves 21c do not intersect the second air bleeding grooves 21d in plan view. In addition, the positioning grooves 21b and the first air bleeding grooves 21c in the upper surface are offset from the second air bleeding grooves 21d in the lower surface in plan view so that the positioning grooves 21b and the first air bleeding grooves 21c do not superpose on the second air bleeding grooves 21d in the up-down direction. This arrangement can prevent these grooves from superposing on one another in the up-down direction or intersecting one another. Thus, a situation in which the thickness of part of the heat transfer sheet 21 is decreased can be prevented from occurring.

When the heat transfer sheet 21 is compressed, spaces formed between the positioning grooves 21b of the heat transfer sheet 21 and the lower flanges 15c of the intermediate holders 15 are eliminated. However, these spaces may remain. The reason is that these spaces, which oppose the lower flanges 15c, do not affect the heat transfer property of the heat transfer sheet 21. Furthermore, because of the presence of these spaces, contact pressure between the upper surface of the heat transfer sheet 21 and the cooling surfaces 14a is increased, and accordingly, gaps can be prevented from being formed between the upper surface of the heat transfer sheet 21 and the cooling surfaces 14a.

Since the cooling plate 12 is a hollow member with the refrigerant path 12c defined therein, the upper wall portion 12a is bent into a downward arc shape by an application of the weight of the battery modules 13 to the upper wall portion 12a. This causes the distance between the cooling surfaces 14a of each battery module 13 and the upper wall portion 12a to be increased in the central portion in the long side direction relative to that in both the end portions in the long side direction. As a result, when it is assumed that the heat transfer sheets 21 each have a uniform thickness, contact pressure of the heat transfer sheet 21 in the central portion in the long side direction is decreased, and accordingly, the heat transfer sheet 21 cannot be sufficiently compressed. This may allow a gap to be formed in low-contact-pressure parts, thereby degrading the heat transfer property.

However, according to the present embodiment, as illustrated in FIG. 7B, the thickness of the heat transfer sheet 21 is large in the central portion in the long side direction and small in both the end portions in a long side direction. Thus, even when the upper wall portion 12a of the cooling plate 12 is bent into a downward arc shape, a uniform contact pressure can be applied to the entire area of the heat transfer sheet 21 so as to compress the central portion in the long side direction similarly to the both the end portions in the long side direction. Thus, the gap is prevented from being formed between the heat transfer sheet 21 and the upper wall portion 12a, and the heat transfer property can be prevented from being degraded.

When the upper wall portion 12a of the cooling plate 12 is bent into a downward arc shape, the central portions of the battery modules 13 in the long side direction, the battery modules 13 being supported by the upper wall portion 12a, tend to be bent into a downward arc shape. However, since the thickness of each heat transfer sheet 21 is increased at its central portion in the long side direction, a reaction load that pushes up the central portion in the long side direction of each battery module 13 is increased, and accordingly, bending of the battery module 13 can be suppressed. Furthermore, as illustrated in FIGS. 7B and 7C, the widths of the positioning grooves 21b formed in the upper surface of each heat transfer sheet 21 become smaller as the positions of the positioning grooves 21b become closer to the central portion in the long side direction. Thus, the central portion in the long side direction of the heat transfer sheet 21 is not easily compressed, and accordingly, the upward reaction load at the central portion increases. As a result, bending of the battery modules 13 can be more reliably suppressed.

The temperatures of the battery cells 14 increase when charging or discharging the battery cells 14 and decrease when charging or discharging of the battery cells 14 is stopped. When the temperatures of the battery cells 14 decrease, moisture in the air condenses and adheres onto the surfaces of the battery modules 13. When the water having condensed flows downward due to gravity and reaches the cooling plate 12, a ground fault in which an electrode of the battery cell 14 is electrically connected to the cooling plate 12 may occur.

However, according to the present embodiment, the electrically insulative sheet 22 disposed on the lower side of each heat transfer sheet 21 is formed to have a tray shape provided with the side wall portions 22b that extend upward from the bottom wall portion 22a. This allows the electrically insulative sheet 22 to hold the water having condensed therein and prevents the water having condensed from flowing toward the cooling plate 12. Thus, occurrence of the ground fault can be reliably prevented. Furthermore, since each electrically insulative sheet 22 is formed of a water-repellent material, the water having condensed on the surface of the electrically insulative sheet 22 is formed into separate drops. Thus, a situation in which the battery modules 13 are electrically connected to the cooling plate 12 can be more effectively prevented.

Although the embodiment of the present application has been described above, a variety of design modifications are possible without departing from the gist of the present application.

For example, the heat transfer sheets 21 do not necessarily have an adhesive property. The heat transfer sheets 21 having no adhesive property may instead be used. Even in the case where the heat transfer sheets 21 do not have an adhesive property, the heat transfer sheets 21 can be easily and correctly positioned with the positioning holes 21a formed therein.

The heat transfer sheets 21 may be formed of a porous material having a water absorbing property. In this case, the ground fault can be more reliably prevented from occurring.

Figure 11A:
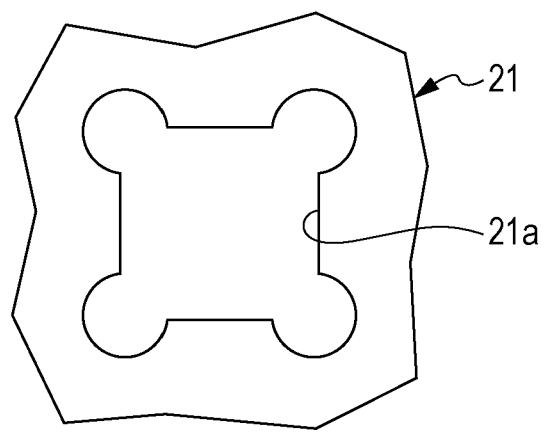
FIGS. 11A to 11C illustrate alternative embodiments of a positioning hole (second to fourth embodiments).
Figure 11B:
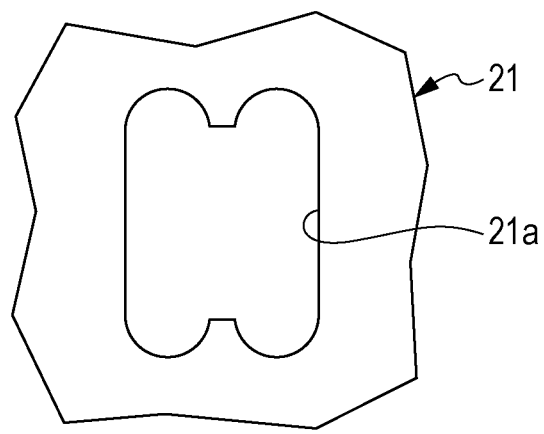
Figure 11C:
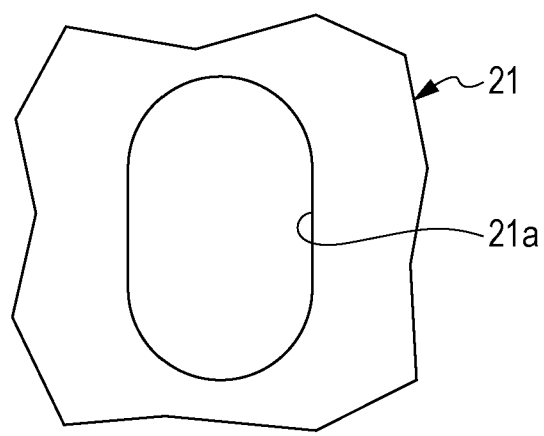

The shape of the positioning holes 21a is not limited to the shape described in the aforementioned embodiment. The shape of the positioning holes 21a may be selected from a variety of shapes as illustrated in FIGS. 11A to 11C as second to fourth embodiments. In any case, it is desirable that the positioning holes 21a each have rounded corners so as to prevent stress from being concentrated.

Although the positioning holes 21a oppose the lower flanges 15c of the intermediate holders 15 in the aforementioned embodiment, it is sufficient that the positioning holes 21a each oppose a portion on the lower surface of the battery module 13, the portion serving as a certain mark.

The refrigerant is not limited to air. The refrigerant may be water.

A battery cooling structure according to an aspect of the embodiment cools a battery module that includes a plurality of battery cells arranged side by side and a cooling surface. The battery cooling structure includes a cooling plate and a heat transfer sheet, which is sandwiched between the cooling surface of the battery module and the cooling plate. The heat transfer sheet is deformable by a pressure applied to the heat transfer sheet, and heat generated in the battery module is transferred from the cooling surface to the cooling plate through the heat transfer sheet so as to cool the battery module. In the battery cooling structure, the heat transfer sheet has a positioning hole through which the cooling surface of the battery module is visible.

According to the aspect of the embodiment, the battery module is supported on the cooling plate such that the heat transfer sheet, which is deformable by a pressure applied to the heat transfer sheet, is sandwiched between the cooling surface of the battery module and the cooling plate. Thus, by deformation of the heat transfer sheet, formation of a gap between the cooling surface of the battery module and the cooling plate can be prevented. This allows heat generated in the battery module to be efficiently transferred from the cooling surface to the cooling plate through the heat transfer sheet, and accordingly, an effect by which the battery module is cooled can be improved. When the heat transfer sheet is positioned with respect to the cooling surface of the battery module and the heat transfer sheet is incorrectly positioned, the heat transfer sheet is misaligned with the cooling surface. However, with the structure according to the aspect of the embodiment, the operator can visually check the cooling surface of the battery module through the positioning hole formed in the heat transfer sheet. Thus, the operator can easily and correctly position the heat transfer sheet with respect to the cooling surface of the battery module.

The cooling structure of the embodiment may further include a holder disposed in the battery module so as to be sandwiched between the plurality of battery cells and so as to oppose the positioning hole.

This can reduce degradation of a heat transfer property, which is caused by positioning hole formed in the heat transfer sheet, as much as possible, and in addition, allow the operator to check the positional relationship between the positioning hole of the heat transfer sheet and the holder. Thus, precision with which the heat transfer sheet is positioned can be improved.

The heat transfer sheet of the embodiment may have a plurality of the positioning holes formed therein.

Thus, precision with which the heat transfer sheet is positioned with respect to the cooling surface of the battery module can be further improved.

The battery cooling structure of the embodiment may further include a protruding wall portion disposed in the battery module so as to surround the cooling surface and to protrude toward the cooling plate side.

Thus, even when the heat transfer sheet, which is sandwiched between the cooling surface and the cooling plate, is deformed so as to outwardly expand, the heat transfer sheet can be prevented from outwardly expanding beyond the cooling surface. In addition, degradation of the heat transfer property, which is caused by positioning hole formed in the heat transfer sheet, can be reduced as much as possible due to a decrease in the opening area of the positioning hole caused by inward deformation of the heat transfer sheet, the outward expansion of which is blocked by the protruding wall portion.

The holder of the embodiment may have a positioning portion having a width smaller than a width of the positioning hole, and the heat transfer sheet may have a plurality of the positioning holes formed along the positioning portion.

In this case, precision with which the heat transfer sheet is positioned can be further improved because the operator can check the state of the entire positioning holes through the plurality of positioning holes.

Obviously, numerous modifications and variations of the present invention are possible in light of the above teachings. It is therefore to be understood that within the scope of the appended claims, the invention may be practiced otherwise than as specifically described herein.

What is claimed is:

1. A battery cooling structure comprising:
   a cooling plate to cool a battery module including a plurality of battery cells arranged side by side;
   a heat transfer sheet provided between the cooling plate and a cooling surface of the battery module to transfer heat from the cooling surface to the cooling plate, the heat transfer sheet being deformable by a pressure applied to the heat transfer sheet, the heat transfer sheet including a positioning hole through which the cooling surface of the battery module is visible when the heat transfer sheet is assembled to the battery module; and
   a holder including a positioning portion having a width smaller than a width of the positioning hole,
   wherein the heat transfer sheet includes a plurality of the positioning holes provided along the positioning portion.

2. The battery cooling structure according to claim 1 wherein the holder provided between the plurality of battery cells of the battery module to oppose the positioning hole.

3. The battery cooling structure according to claim 1, wherein the holder includes a protruding wall portion disposed in the battery module to cover at least a part of the cooling surface, the protruding wall portion protruding toward the cooling plate along the cooling surface.

4. The battery cooling structure according to claim 1, further comprising:
   an electrically insulative sheet provided between the cooling plate and the heat transfer sheet.

5. The battery cooling structure according to claim 1, wherein the heat transfer sheet is made of a synthetic resin.

6. The battery cooling structure according to claim 1, wherein the positioning hole opposes a portion on the cooling surface of the battery module.

7. The battery cooling structure according to claim 1, wherein the holder includes a lower flange, and
   wherein the plurality of positioning holes are configured to oppose the lower flange.

8. The battery cooling structure according to claim 1, wherein the heat transfer sheet is made of silicone rubber.

9. The battery cooling structure according to claim 1, wherein the heat transfer sheet has an adhesive property.

10. A battery cooling structure comprising:
    a cooling plate to cool a battery module including a plurality of battery cells arranged side by side; and
    a heat transfer sheet provided between the cooling plate and a cooling surface of the battery module to transfer heat from the cooling surface to the cooling plate, the heat transfer sheet being deformable by a pressure applied to the heat transfer sheet, the heat transfer sheet including a positioning hole through which the cooling surface of the battery module is visible when the heat transfer sheet is assembled to the battery module,
    wherein the heat transfer sheet includes
       a first surface in contact with the cooling surface of the battery module,
       a second surface opposite to the first surface, and
       a positioning groove provided on the first surface, and
    wherein the positioning hole is provided on the second surface and in the positioning groove.

11. The battery cooling structure according to claim 10, further comprising:
    a holder including
       a holder body portion provided between the plurality of battery cells of the battery module, and
       a positioning portion extending from an edge of the holder body portion along the cooling surface of the battery module,
    wherein the positioning portion is provided in the positioning groove to oppose the positioning hole.

12. A battery cooling structure comprising:
    a cooling plate to cool a battery module including a plurality of battery cells arranged side by side;
    a heat transfer sheet provided between the cooling plate and a cooling surface of the battery module to transfer heat from the cooling surface to the cooling plate, the heat transfer sheet being deformable by a pressure applied to the heat transfer sheet, the heat transfer sheet including a positioning hole through which the cooling surface of the battery module is visible when the heat transfer sheet is assembled to the battery module; and
    a holder including a positioning portion having a width smaller than a width of the positioning hole,
    wherein the heat transfer sheet includes a plurality of the positioning holes provided along the positioning portion.

13. A battery cooling structure comprising:
    a cooling plate to cool a battery module including a plurality of battery cells arranged side by side; and
    a heat transfer sheet provided between the cooling plate and a cooling surface of the battery module to transfer heat from the cooling surface to the cooling plate, the heat transfer sheet being deformable by a pressure applied to the heat transfer sheet, the heat transfer sheet including a positioning hole through which the cooling surface of the battery module is visible when the heat transfer sheet is assembled to the battery module, wherein the heat transfer sheet includes
- a first surface in contact with the cooling surface of the battery module,
- a second surface opposite to the first surface, and
- a positioning groove provided on the first surface, and wherein the positioning hole is provided on the second surface and in the positioning groove.

14. The battery cooling structure according to claim 13, further comprising:

a holder including
- a holder body portion provided between the plurality of battery cells of the battery module, and
- a positioning portion extending from an edge of the holder body portion along the cooling surface of the battery module, wherein the positioning portion is provided in the positioning groove to oppose the positioning hole.

* * * * *